United States Patent [19]

Pitel et al.

[11] Patent Number: 5,568,371
[45] Date of Patent: Oct. 22, 1996

[54] ACTIVE HARMONIC POWER FILTER APPARATUS AND METHOD

[75] Inventors: Ira J. Pitel, Morristown, N.J.; Prasad Enjeti, College Station, Tex.

[73] Assignee: Texas A&M University System, College Station, Tex.

[21] Appl. No.: 314,880

[22] Filed: Sep. 29, 1994

[51] Int. Cl.⁶ .................. H02J 1/02; H02M 1/12
[52] U.S. Cl. .................. 363/39; 363/42; 361/113
[58] Field of Search .................. 363/39–42; 323/247, 323/248; 361/113

[56] References Cited

U.S. PATENT DOCUMENTS

| | | | |
|---|---|---|---|
| 5,343,079 | 8/1994 | Mohan et al. | 363/40 |
| 5,345,375 | 9/1994 | Mohan | 363/40 |
| 5,499,155 | 3/1996 | Gershen et al. | 361/113 |

OTHER PUBLICATIONS

"Nonlinear Loads Mean Trouble," *EC&M* Mar. 1988.
"Double the Neutral and Derate the Transformer—Or Else," *EC&M* Dec. 1988.
"Excessive Neutral Currents in Three–Phrase Fluorescent Lighting Circuits," *IEEE Transaction on Industry Applications*, vol. 25, No. 4, Jul./Aug. 1989.
"A Survey of Neutral Currents in Three–Phase Computer Power Systems," *IEEE Transactions on Industry Applications*, vol. 26, No. 4 Jul./Aug. 1990.
New product introduction, "SURESINE, Active Power Line Conditioner" Westinghouse ESG 1993.
"Neutral Current Reducer, An Affordable Off-the-Shelf Solution for Excessive Neutral Currents" I-Trap.

*Primary Examiner*—Stuart N. Hecker
*Attorney, Agent, or Firm*—Shaffer & Culbertson; J. Nevin Shaffer, Jr.

[57] ABSTRACT

Described is an active filter (10) for removing harmonic currents from a neutral wire (24) to reduce the current $I_n$ in the neutral wire. The filter (10) typically is located away from the source (26) and near the load (28). The filter (10) comprises generally a multi-phase transformer (12), a neutral current monitoring device (14), and a harmonic current injection device (16). The components of the present invention operate to draw a corrective harmonic current ($I_N$) from the neutral wire (24) at a tap point (T) near the load (28) and inject the corrective harmonic current ($I_N$) through the multi-phase transformer (12) into the phase wires (20). The corrective harmonic current ($I_N$) substantially cancels the harmonic current ($I_n$) in the line on the source side of the tap point (T) and therefore eliminates over-current conditions in the neutral wire. The device preferably includes a rectifier (36) connected by the secondary windings (34) of the transformer (12) to power a DC bus (38). An inverter (50), powered by the DC bus (38), is selectively controlled to construct the corrective harmonic current. Embodiments employing both half-bridge and full-bridge inverters are described as are embodiments using both wye-delta and zigzag transformers. The present invention also includes a method consistent with the operation of the filter.

15 Claims, 3 Drawing Sheets

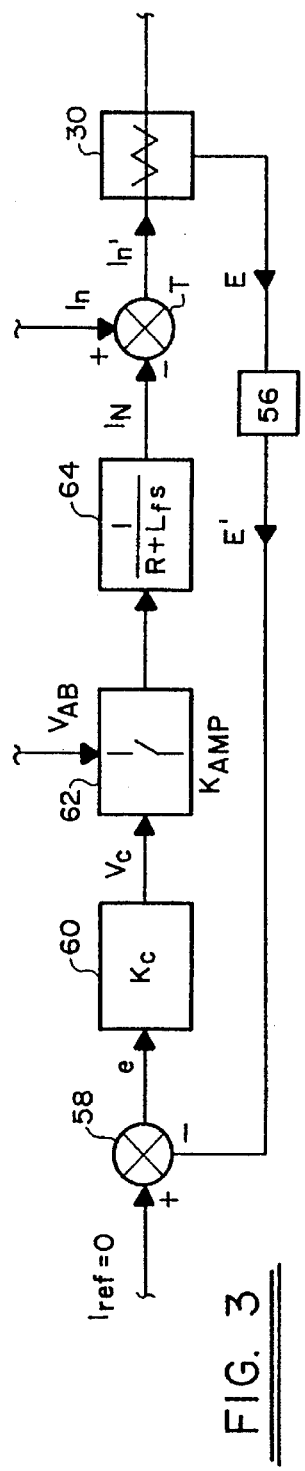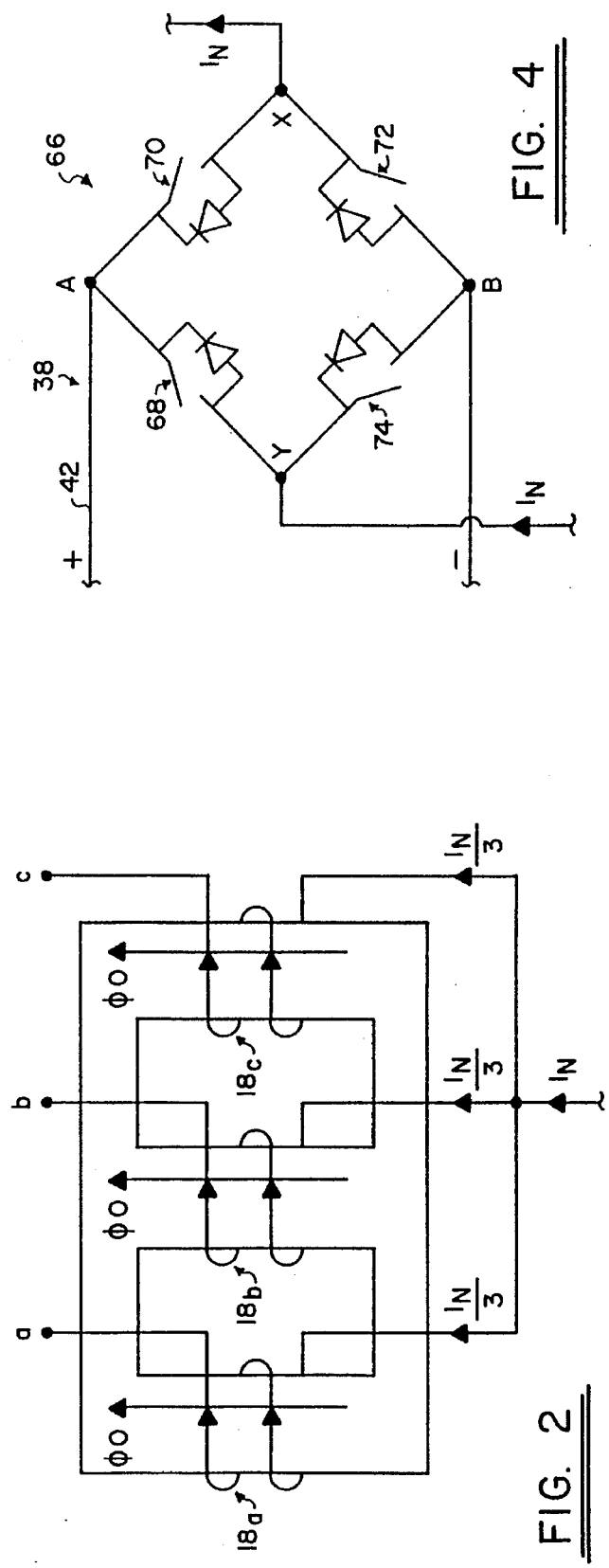

ACTIVE HARMONIC POWER FILTER APPARATUS AND METHOD

BACKGROUND OF THE INVENTION

This invention relates to the removal of harmonic currents from power distribution lines. More particularly, this invention relates to an active power filter that cancels the harmonic currents in the neutral wire of a three-phase, four-wire electric distribution system.

A typical low voltage electric distribution system in the U.S. consists of a 208/120 volt three-phase, four-wire system. These systems are widely employed to distribute electric energy to loads within buildings and plants. In such systems, under normal operating conditions with nearly balanced loads, the current in the neutral wire is small and does not exceed twenty percent of the normal phase current magnitude.

However, in recent years, the use of solid-state power conversion equipment to service loads has greatly increased. Typical loads now connected to the low voltage three-phase, four-wire system include adjustable speed heating ventilation and air-conditioning (HVAC) systems, fluorescent lighting circuits with conventional and electronic ballasts, computer systems, and other sensitive electronic loads. All of these loads employ switched mode type power electronic converters which draw excessive harmonic currents, a significant portion being the third harmonic (180 Hz) component. Further, saturated iron cored inductive ballasts as well as electronic ballasts in fluorescent lighting circuits also contribute to third harmonic currents. The third harmonic and odd multiples of the third harmonic (i.e. 9th, 15th, etc.) do not cancel each other in the neutral wire but in fact are additive. These harmonic currents flow back to the power system through the neutral wire.

Resultantly, the neutral current in the modern three-phase, four-wire distribution systems is often excessive. In some installations, the neutral current magnitude exceeds the magnitude of the phase currents. The excessive neutral current often causes wiring failures, wire overheating, and damages distribution transformers. The excessive neutral current also causes noise due to thermal cycling and excessive neutral to ground voltage drop, both of which can damage sensitive electronic equipment.

Prior remedies to the excessive neutral current problem included derating transformers, using separate neutral wires for non-linear loads, tripping phase wires when the neutral current exceeded a threshold level, and simply increasing the capacity of the neutral wire. However, these solutions inevitably failed. Derating distribution transformer ratings temporarily solved the problem but resulted in a lower efficiency of operation and required that additional units be installed to serve existing load. Further, installing separate neutral wires to serve non-linear loads and increasing the size of the neutral wires is often non-feasible, always expensive, and does not eliminate the underlying problem.

Another proposed solution, included selectively filtering harmonic components of the neutral current wire using passive filters. However, since passive filters are dependent upon the particular frequency, are expensive, and are typically inefficient, they also were unsatisfactory. Another proposed solution included the use of nonstandard zigzag transformer connections to allow circulation of triple harmonics in the secondary windings of the transformer. The technique, even though somewhat effect, was sensitive to the system impedance and often required a choke to isolate the neutrals of the power system from the zigzag transformer. However, once installed, the choke caused the power system neutral voltage to float.

SUMMARY OF THE INVENTION

It is therefore a general object of the invention to overcome the above described limitations and others relating to excessive neutral currents caused by non-linear loads. More particularly, it is an object of the invention to provide an active harmonic current filter that monitors the harmonic current in the neutral wire and injects a correcting current to cancel the harmonic current in the neutral wire.

To accomplish these objects, an apparatus for filtering harmonic currents in a neutral wire comprises generally a multi-phase transformer, neutral current monitoring means, and harmonic current injection means. The components of the present invention work in harmony to draw a corrective harmonic current from the neutral wire at a tap point near the load and inject the corrective harmonic current through the multi-phase transformer into the phase wires. The corrective harmonic current substantially cancels the harmonic current in the neutral wire on the source side of the tap point and therefore eliminates over-current conditions in the neutral wire.

The multi-phase transformer preferably includes both primary and secondary windings. The primary windings electrically connect to phase wires of the electrical power distribution system and provide a neutral voltage point between at least two of the phases. The secondary windings allow triplen harmonics to circulate and also supply a rectifier that provides a DC voltage used by the harmonic current injection means.

The neutral current monitoring means monitors the harmonic current in the neutral wire and produces a neutral current error signal that represents the harmonic current in the neutral wire on the source side of a neutral wire tap point. Preferably, the neutral current monitoring means is a current transformer located on the source side of the neutral wire tap point. The neutral current error signal is filtered to remove any system frequency component, typically 60 Hz. Therefore, the value of the neutral current error signal is zero when no harmonic current flows on the neutral wire on the source side of the tap point.

Responsive to the neutral current error signal, the harmonic current injection means removes a corrective harmonic current from the neutral wire at the tap point and injects the corrective harmonic current into the phase wires at the neutral voltage point of the multi-phase transformer. Functioning properly, the harmonic current injection means completely removes the harmonic current in the neutral wire at the tap point so that no harmonic current flows on the source side of the neutral wire tap point. Preferably, the harmonic current injection mean uses an inverter employing pulse width modulation to create the corrective harmonic current. A rectifier, fed from the transformer secondary winding, powers a DC bus that in turn powers the inverter.

In operation, the active harmonic filter continuously monitors the neutral wire harmonic current and responsively cancels the neutral harmonic current. The active power filter does not consume real power other than that required to account for internal losses. Thus, the filter exceeds 90% efficiency. Because the filter is active and continuously monitors the neutral current, it instantaneously adapts to changing load conditions and harmonic contents. Because pulse width modulation is used with a preferred switching frequency of at least 20 kilohertz, the active filter has sufficient bandwidth to cancel several zero sequence harmonics appearing in the neutral wire, these harmonics being typically the most damaging. Finally, because the active harmonic filter of the present invention requires only a single inverter and feeds the neutral point on the transformer, it is compact, small, and light in weight.

These and other objects, advantages, and features of the invention will be apparent from the following description of the preferred embodiments, considered along with the accompanying drawings.

BRIEF DESCRIPTION OF THE DRAWINGS

FIG. 2 is a diagrammatic view of the transformer of the embodiment of FIG. 1 detailing the core and the primary windings.

FIG. 3 is a functional block diagram of the harmonic current injection means of the active harmonic power filter of FIG. 1.

FIG. 4 is an electrical schematic of a full-bridge inverter that may optionally be used instead of the half-bridge inverter shown in the embodiment of FIG. 1.

DESCRIPTION OF THE PREFERRED EMBODIMENTS

Figure 1:
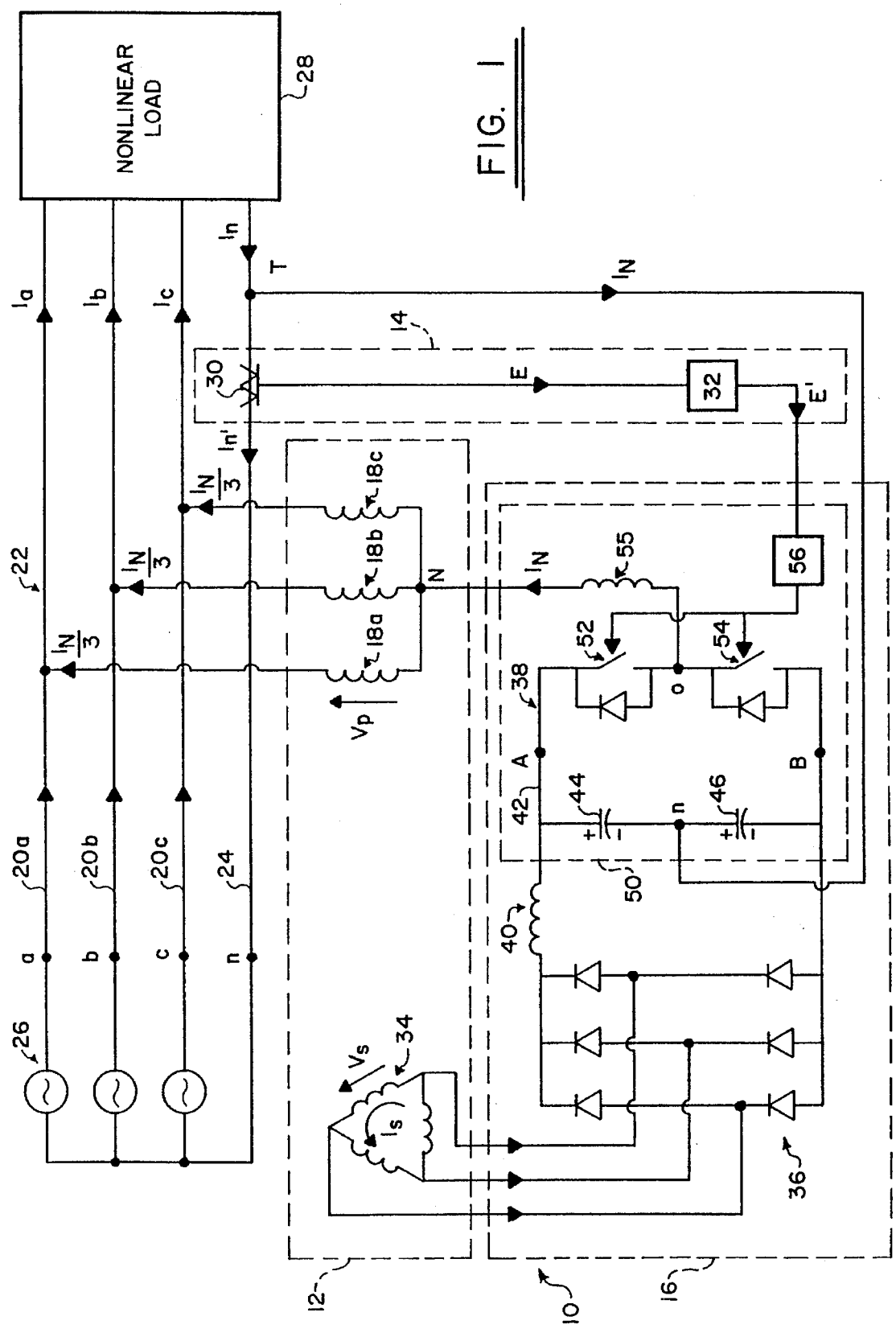
FIG. 1 is an electrical schematic diagram of an active harmonic power filter embodying the principles of the present invention.

Two particular embodiments of active harmonic filters for cancelling harmonic currents in a neutral wire associated with a multiple phase electrical power distribution system are shown by way of illustration in FIGS. 1–5. Referring to FIG. 1, a first active harmonic filter 10 embodying the principles of the present invention comprises a multi-phase transformer 12, neutral current monitoring means 14, and harmonic injection means 16.

The a multi-phase transformer 12 has primary windings (18a, 18b, and 18c) that are electrically connected to phase wires (20a, 20b, and 20c) of the electrical power distribution system, referred to generally as reference numeral 22. The multi-phase transformer 12 preferably is a three-phase, wye-delta transformer and has a neutral voltage point, N, between the phases. The delta connected secondary winding 34 provides a path for zero sequence currents to circulate. The transformer primary 18 and secondary 34 windings are sized according to the installation size so that the transformer 12 may provide sufficient capacity to the filter 10. Because no real power is delivered by the filter 10, except for losses, the transformer 12 may be sized relatively small.

As shown, the electrical power distribution system 22 includes the phase wires 20a, 20b, and 20c, a neutral wire 24, a three-phase voltage source 26, and a non-linear load 28. Typically, the non-linear load 28 includes fluorescent lighting, computer equipment, solid-state power supplies, and other equipment that generates harmonics of the system frequency under load. As previously discussed, the non-linear load 28 causes primarily harmonic current $I_n$ to flow in the neutral wire 24.

The neutral current monitoring means 14 monitors a harmonic current in the neutral wire 24 and produces a neutral current error signal E that indicates the current in the neutral wire on the source side of a neutral wire tap point T. Preferably, the neutral current monitoring means 14 comprises a current transformer 30 located on the source side of the neutral wire tap point T and a notch filter 32. The current transformer 30 transforms the neutral current $I'_n$ to produce a neutral current error signal E that is proportional to the neutral current $I'_n$. The notch filter 32 then filters the system frequency components from the error signal E to produce a harmonic error signal E'. Typically, in the United States, the system frequency is 60 hertz, and therefore, the notch filter is tuned to 60 hertz. Because of the nature of the non-linear load 28, the harmonic error signal E' contains primarily the triplen harmonics, 3rd, 9th, 15th, etc. These triplen harmonic components therefore relate to frequencies of 180 hertz, 540 hertz, 900 hertz, etc.

The harmonic current injection means 16 operates responsively to the harmonic error signal E' and removes a corrective harmonic current $I_N$ from the neutral wire 24 at the neutral wire tap point T. Operating perfectly, the corrective harmonic current $I_N$ equals exactly the harmonic component of the current flowing in the neutral wire 24. Once removed from the neutral wire, the corrective harmonic current $I_N$ is injected into the phase wires 20 of the electrical power distribution system at the neutral voltage point N of the multi-phase transformer 12. Resultantly, the harmonic current injection means 16 substantially cancels the harmonic current in the neutral wire 24 so that the current $I'_n$ on the source side of the neutral wire tap point T has little or no harmonic component.

The harmonic current injection means 16 preferably comprises rectifier means 36 and an inverter 50. Preferably, the rectifier means 36 comprises a three-phase, six diode, full-wave rectifier connected to the secondary windings 34 of the wye-delta transformer 12. The rectifier means 36 provides a DC voltage $V_{AB}$ across a DC bus 38 that is used to power the inverter 50. Only a small amount of power must be supplied by the secondary windings 34 of the transformer to maintain the DC voltage since little real power is consumed. A series inductor 40, connected in series on a first side 42 of the DC bus 38, reduces harmonic input currents on the DC bus 38. Capacitor means comprising first 44 and second 46 capacitors connected in series across the DC bus 38 serve the dual purposes of smoothing the DC voltage across the DC bus 38 and providing a DC voltage tap point, n, at a voltage approximately one-half of the voltage across the DC bus. Because the delta connected secondary winding 34 provides a path for zero sequence currents to circulate, the neutral voltage point N is held at the same potential as the rectifier supply neutral voltage point n. The operation of rectifiers is well known in the art and is not further described herein.

Preferably, the harmonic current injection means 16 controls the corrective harmonic current $I_N$ using a two-switch/half-bridge inverter 50 and employs the pulse width modulation (PWM) technique. In the embodiment of the filter 10 shown in FIG. 1, the two-switch/half-bridge inverter 50 is connected across the DC bus 38. The inverter 50 operates such that either a first switch 52 is closed and a second switch 54 is open (a first state) or the first switch is open and the second switch is closed (a second state). The DC bus voltage is defined as $V_{AB}$ and dependent upon the voltage on the secondary windings 34 of the transformer 12. The voltage between points o and n is defined as $V_{on}$ and is dependent upon the positions of the first 52 and second 54 switches. In the first state, the voltage $V_{on}$ is $½*V_{AB}$ or the voltage across the first capacitor 44. In the second state, the voltage $V_{on}$ is $-\frac{1}{2}*V_{AB}$ or the voltage across the second capacitor 46. A pulse width modulation controller 56 operates to construct the corrective harmonic current $I_N$ by selectively moving the switches 52 and 54 from the first position to the second position. Inductor 55 is selected to filter the switching harmonics caused by the PWM operation of the two switches.

The operation of the pulse width modulation controller 56 is illustrated in the form of a block diagram description in FIG. 3. As shown in FIG. 3, the neutral current $I'_n$ is sensed via a current sensor 30 to produce the error signal E. The error signal E is then passed through a 60 Hz notch filter 56 to produce the harmonic error signal E'. The harmonic error signal E' is then compared with a reference signal $I_{ref}$ at comparator 58. The reference $I_{ref}$ is set to a level of zero as the desired neutral current will contain no harmonics. The resulting error signal e is then passed through a controller gain stage 60 having a gain of $K_c$ to produce a controlling signal $V_c$. The controlling signal $V_c$ is used as the modulating signal for the power switching block $K_{AMP}$ 62. By comparing $V_c$ with a high frequency triangle wave ($\approx$20kHz) the PWM gating signals for the inverter switches 52 and 54 are generated. Hence, if the peak amplitude of the triangular wave is $A_T$ then, $$K_{AMP} = \frac{V_c V_{AB}}{A_T 2} \qquad (4)$$

where $V_{AB}$ is the DC bus 38 voltage. The passive element block 64 represents the delay effect of the inductor 55 in the signal path and the inherent resistive loss.

Once constructed, the current injected by the active power filter $I_N$ is compared to the actual neutral current $I_n$. The result of this comparison is $I'_n$ and the subtraction is due to the fact that $I_N$ is 180° out of phase with $I_n$. The resulting manipulated signal E' is again compared to $I_{ref}$ and a new error signal is generated. In closed loop, the measured error is reduced to near zero and the neutral current harmonics are effectively removed. Further, the closed loop will respond to any changes in the load condition and apply appropriate and continuous cancellation.

Mathematically modeled, the closed loop control system is a first order system. The open loop transfer function between the controlled output and the error signal is given by, $$G_1(s) = \frac{(I_n - I_N)(s)}{e(s)} = \frac{K_c \cdot K_{amp}}{R + L_f s} \qquad (5)$$

The corresponding closed loop transfer function can now be expressed as, $$\frac{(I_n - I_N)(s)}{I_{ref}(s)} = \frac{K_c \cdot K_{AMP}}{R + L_f s + K_c \cdot K_{AMP}} \qquad (6)$$

where, $K_c$=Controller gain $K_{AMP}$=Gain in the half-bridge PWM inverter stage $L_f$=Filter inductor R=resistance in the current path The closed loop transfer function between the controlled output $I_n-I_N$ is given by, $$\frac{(I_n - I_N)(s)}{I_N(s)} = \frac{R + L_f s}{R + L_f s + K_c \cdot K_{AMP}} \qquad (7)$$

In these equations, the values of the gains $K_c$ and $K_{AMP}$ determine the amount of corrective effort that is applied for a given magnitude of error. Hence, if the controller gain is low the amount of current $I_N$ injected into the neutral is small. On the other hand, if $K_c$ is too large, instability is likely to result. Therefore the magnitude of the steady state error, the value to which the error signal tends as the transient dies out, is of importance. In this case, the steady state error, $e_{ss}$, is found to be, $$e_{ss} = \lim_{s \to 0} \frac{1}{1 + \frac{K_c \cdot K_{AMP}}{R + L_f s}} = \frac{1}{1 + K_p} \qquad (8)$$

where, $$K_p = \frac{K_c \cdot K_{AMP}}{R} \qquad (9)$$

Thus, the steady state error of the first order system if finite and suitable values are selected for $K_p$ in order to produce a low steady state error.

The current injection technique neutralizes any harmonic current that is flowing in the neutral, and thus protects the upstream distribution system 22 and neutral wire 24. Hence, if the neutral current is entirely third harmonic, and the filter is canceling 100% of the third harmonic current flowing in the neutral, then $I_N=I_n$ and $I'_n=0$. It should be noted that the injected harmonic current $I_N$ is essentially zero sequence (3rd, 9th, etc.). This zero sequence current is equally divided between the three primary windings of the filter transformer such that $I_p=I_N/3$.

Referring now to FIG. 4, an inverter 66 with a full-bridge configuration could be used to replace the half-bridge inverter 50. As shown in FIG. 4, instead of having two controllable switches, the full-bridge inverter 50 has four controllable switches, 68, 70, 72, 74. Constructed in this fashion, the PWM controller 56 can regulate the voltage $V_{XY}$ such that the voltage is zero, positive the DC bus 38 voltage $V_{AB}$, or the negative DC bus voltage $V_{AB}$. The advantage of using a full-bridge inverter 50 relate to the three voltage states producible at $V_{AB}$. Using the three voltage states, the inverter 50 may be switched to produce less switching related harmonic distortion than that generated by a half-bridge inverter. Thus, a smaller inductor $L_F$ may be used to prevent the switching harmonic distortion from propagating back into the power system. Because the operation of a full-bridge inverter 50 is well known in the art, its operation and construction are not further considered herein.

Figure 5:
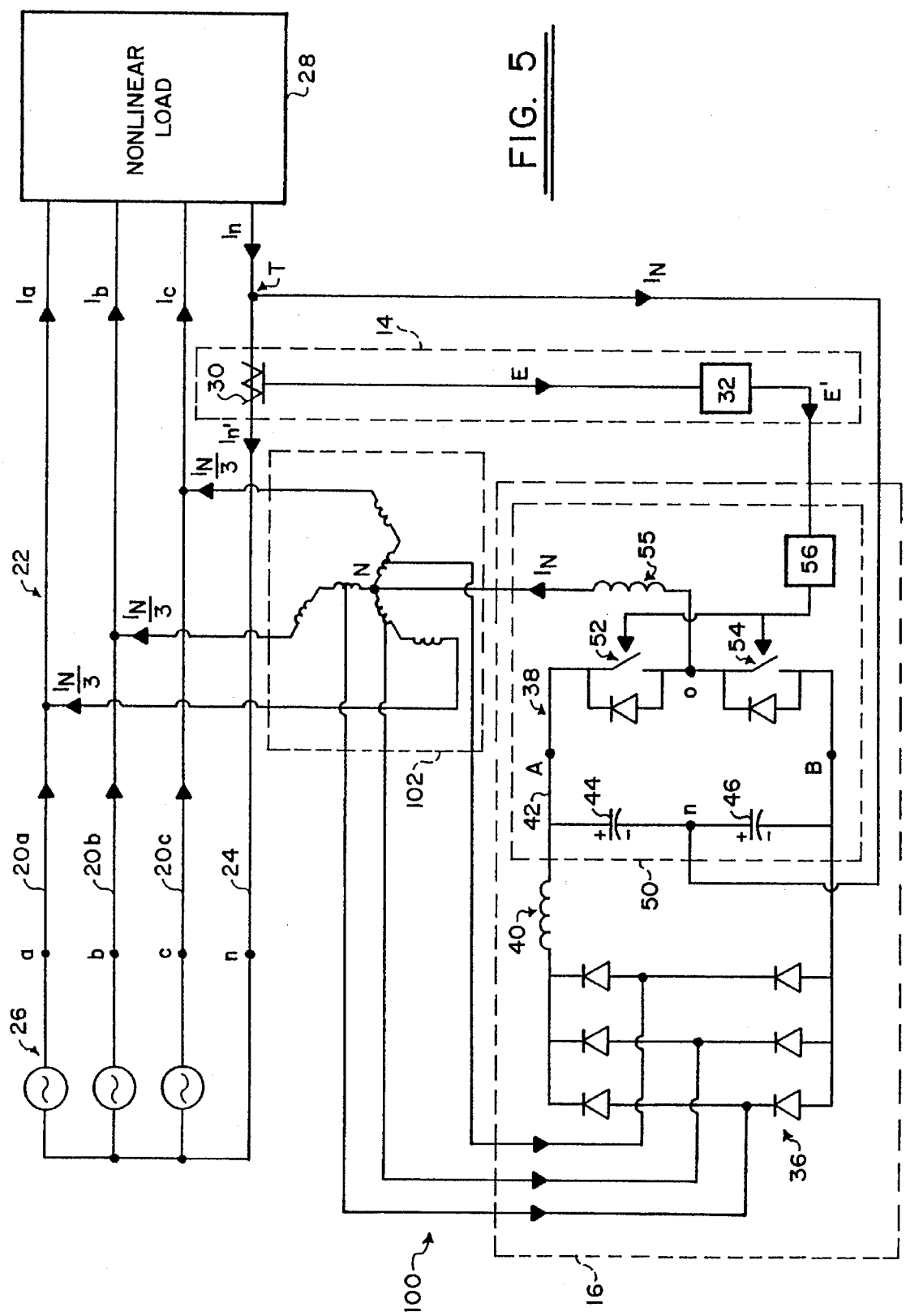
FIG. 5 is an electrical schematic diagram of a second embodiment of an active harmonic power filter embodying the principles of the present invention.

Referring now to FIG. 5, an active filter 100 of a second preferred embodiment of the present invention is illustrated. Those components remaining unchanged retain the same numbering convention. The primary difference between the embodiment shown in FIG. 5 as compared to the embodiment shown in FIGS. 1 though 3 is the transformer 102. While the transformer 12 of the first embodiment was a wye-delta transformer, the transformer of the active filter 100 of the second embodiment is a zigzag transformer. While the zigzag transformer 102 is very similar in operation to the wye-delta transformer 12, it allows for a reduction in overall filter size. This is possible because the zigzag transformer 102 effectively has two windings to support each phase voltage. Thus, the overall winding kVA of the transformer 102 is reduced, making it physically smaller, less costly, and of higher efficiency.

The interconnection of the zigzag transformer 102 is very similar to that of the proposed active power filter. The zigzag transformer 102 provides a path for the injection current $I_N$ to flow through the transformer and into each phase conductor. Taps taken from the zigzag transformer 102 are used to supply the DC bus 38 voltage for the two switches 52 and 54 associated with the inverter 50.

The present invention also includes a method for cancelling harmonic currents in a neutral wire associated with a multiple phase electrical power distribution system. Referring to FIG. 1, the method includes as a first step monitoring a harmonic current $I'_n$ in a neutral wire 24. A next step includes producing a neutral current error signal, E', that indicates the harmonic current $I'_n$ in the neutral wire on a source side of a neutral wire tap point T. A further step includes removing a corrective harmonic current $I_N$ from the neutral wire 24 at the neutral wire tap point T to substantially cancel the harmonic current in the neutral wire on the source side of the neutral wire tap point. A final step includes injecting the corrective harmonic current $I_N$ into phase wires 20 of an electrical power distribution system 22 at a neutral voltage point N of a multi-phase transformer 12, the multi-phase transformer having primary windings 18 electrically connected to the phase wires 20 of the electrical power distribution system.

The above described preferred embodiments are intended to illustrate the principles of the invention, but not to limit the scope of the invention. Various other embodiments and modifications to these preferred embodiments may be made by those skilled in the art without departing from the scope of the following claims.

We claim:

1. An apparatus for cancelling harmonic currents in a neutral wire associated with a multiple phase electrical power distribution system, the apparatus comprising:

(a) a multi-phase transformer having primary windings electrically connected to phase wires of the electrical power distribution system and having a neutral voltage point between at least two of the phases;

(b) neutral current monitoring means for monitoring a harmonic current in the neutral wire and for producing a neutral current error signal that indicates the harmonic current in the neutral wire on the source side of a neutral wire tap point; and (c) harmonic current injection means responsive to the neutral current error signal for removing a corrective harmonic current from the neutral wire at the neutral wire tap point and injecting the corrective harmonic current into the phase wires of the electrical power distribution system through the neutral voltage point of the multi-phase transformer to substantially cancel the harmonic current in the neutral wire on the source side of the neutral wire tap point.

2. The apparatus of claim 1 wherein the multi-phase transformer is a three-phase, wye-delta transformer comprising:

(a) three primary windings connected to three phase wires in a wye fashion and having the neutral voltage point at an intersection of the primary windings; and (b) three secondary windings connected in a delta fashion and having three secondary tap points.

3. The apparatus of claim 2 wherein the harmonic current injection means comprises:

(a) rectifier means connected to the secondary tap points of the secondary windings of the wye-delta transformer, the rectifier means for providing a DC voltage across a DC bus; and (b) inverter means connected to the DC bus for employing pulse width modulation to create the corrective harmonic current from the DC voltage.

4. The apparatus of claim 3 further comprising:

(a) capacitor means connected across the DC bus of the rectifier means for smoothing the DC voltage across the bus and for providing a DC voltage tap point at a voltage approximately one-half of the voltage across the DC bus, the DC voltage tap point connected to the neutral wire tap point.

5. The apparatus of claim 3 wherein the inverter means comprises a half-bridge inverter.

6. The apparatus of claim 3 wherein the inverter means comprises a full-bridge inverter.

7. The apparatus of claim 5 wherein the half-bridge inverter comprises:

(a) a first controllable switch connected between a first DC bus terminal and a pulse width modulation neutral point, the pulse width modulation neutral point connected to the neutral voltage point of the wye-delta transformer through an inductive element;

(b) a second controllable switch connected between a second DC bus terminal and the pulse width modulation neutral point; and (c) switch control means for selectively controlling the operation of the first and second controllable switches to construct the corrective harmonic current using pulse width modulation.

8. The apparatus of claim 1 wherein the multi-phase transformer is a zigzag transformer comprising:

(a) three primary windings connected to three phase wires in a wye fashion and having the neutral voltage point at the intersection of the primary windings; and (b) a plurality of secondary windings connected in a zigzag fashion and having three secondary tap points.

9. The apparatus of claim 8 wherein the harmonic current injection means comprises:

(a) rectifier means connected to the secondary tap points of the secondary windings of the zigzag transformer, the rectifier means for providing a DC voltage across a DC bus; and (b) inverter means connected to the DC bus for employing pulse width modulation to create the corrective harmonic current from the DC voltage.

10. The apparatus of claim 9 further comprising:

(a) capacitor means connected across the DC bus of the rectifier means for smoothing the DC voltage across the bus and for providing a DC voltage tap point at a voltage approximately one-half of the voltage across the DC bus, the DC voltage tap point connected to the neutral wire tap point.

11. The apparatus of claim 9 wherein the inverter means comprises a half-bridge inverter.

12. The apparatus of claim 11 wherein the half-bridge inverter comprises:

(a) a first controllable switch connected between a first DC bus terminal and a pulse width modulation neutral point, the pulse width modulation neutral point connected to the neutral voltage point of the multi-phase transformer through an inductive element;

(b) a second controllable switch connected between a second DC bus terminal and the pulse width modulation neutral point; and (c) switch control means for selectively controlling the operation of the first and second controllable switches to construct the corrective harmonic current using pulse width modulation.

13. The apparatus of claim 9 wherein the inverter means comprises a full-bridge inverter.

14. A method for cancelling harmonic currents in a neutral wire associated with a multiple phase electrical power distribution system, the method comprising the steps of:

(a) monitoring a harmonic current in a neutral wire;

(b) producing a neutral current error signal that indicates the harmonic current in the neutral wire on a source side of a neutral wire tap point;

(c) removing a corrective harmonic current from the neutral wire at the neutral wire tap point to substantially cancel the harmonic current in the neutral wire on the source side of the neutral wire tap point; and (d) injecting the corrective harmonic current into phase wires of an electrical power distribution system at a neutral voltage point of a multi-phase transformer, the multi-phase transformer having primary windings electrically connected to the phase wires of the electrical power distribution system.

15. The method of claim 14 further comprising the step of:

(a) employing pulse width modulation to create the corrective harmonic current from a DC voltage source.

* * * * *

UNITED STATES PATENT AND TRADEMARK OFFICE
CERTIFICATE OF CORRECTION

PATENT NO. : 5,568,371

DATED : October 22, 1996

INVENTOR(S) : Ira J. Pitel and Prasad Enjeti

It is certified that error appears in the above-identified patent and that said Letters Patent is hereby corrected as shown below:

Column 1, line 65, change "triple"
to --triplen--.

Signed and Sealed this

Twenty-fifth Day of February, 1997

Attest:

BRUCE LEHMAN

*Attesting Officer*     *Commissioner of Patents and Trademarks*